(12) United States Patent
Ianev et al.

(10) Patent No.: US 12,133,190 B2
(45) Date of Patent: Oct. 29, 2024

(54) CORE NETWORK NODE, UE, ACCESS NETWORK NODE AND CONTROLLING METHOD

(71) Applicant: NEC Corporation, Tokyo (JP)

(72) Inventors: Iskren Ianev, Lower Earley (GB); Toshiyuki Tamura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 404 days.

(21) Appl. No.: 17/606,143

(22) PCT Filed: Apr. 24, 2020

(86) PCT No.: PCT/JP2020/017760
§ 371 (c)(1),
(2) Date: Oct. 25, 2021

(87) PCT Pub. No.: WO2020/226079
PCT Pub. Date: Nov. 12, 2020

(65) Prior Publication Data
US 2022/0303934 A1    Sep. 22, 2022

(30) Foreign Application Priority Data

May 3, 2019 (EP) .................................... 19172648

(51) Int. Cl.
*H04W 60/00* (2009.01)
*H04W 8/18* (2009.01)
(Continued)

(52) U.S. Cl.
CPC ......... *H04W 60/005* (2013.01); *H04W 8/183* (2013.01); *H04W 8/20* (2013.01); *H04W 60/06* (2013.01); *H04W 84/042* (2013.01)

(58) Field of Classification Search
None
See application file for complete search history.

(56) References Cited

U.S. PATENT DOCUMENTS 8,902,905 B2 * 12/2014 Chin ..................... H04W 60/00
370/392
2004/0162077 A1    8/2004 Kauranen et al.
(Continued)

FOREIGN PATENT DOCUMENTS

CN          1751526 A      3/2006
CN          101553055 A    10/2009
(Continued)

OTHER PUBLICATIONS

1 Japanese Office Action for JP Application No. 2021-564312. mailed on Nov. 1, 2022 with English Translation.
(Continued)

*Primary Examiner* — Brian S Roberts

(57) ABSTRACT

The present disclosure proposes combined registration for mobile terminals with multiple SIM subscription from the same PLMN. A mobile terminal with two or more SIM subscriptions from the same PLMN registers for all SIM subscriptions to the same AMF or for each SIM subscription, to different AMFs, or to different RATs via a single combined registration procedure. A combined deregistration procedure is also disclosed in which the UE can deregister for all SIM subscriptions in a single combined deregistration procedure.

8 Claims, 10 Drawing Sheets

(51) Int. Cl.
*H04W 8/20* (2009.01)
*H04W 60/06* (2009.01)
*H04W 84/04* (2009.01)

(56) References Cited

U.S. PATENT DOCUMENTS

| | | | |
|---|---|---|---|
| 2011/0244880 A1 | 10/2011 | Chin et al. | |
| 2012/0282896 A1 | 11/2012 | Toh | |
| 2016/0219648 A1* | 7/2016 | Awoniyi-Oteri | H04W 8/24 |
| 2019/0253994 A1 | 8/2019 | Dong et al. | |
| 2020/0196375 A1* | 6/2020 | Ryu | H04W 76/34 |
| 2020/0245285 A1 | 7/2020 | Dong et al. | |
| 2021/0195548 A1 | 6/2021 | Dong et al. | |
| 2022/0210757 A1* | 6/2022 | Hong | H04W 60/005 |
| 2022/0248360 A1* | 8/2022 | Hong | H04W 12/72 |

FOREIGN PATENT DOCUMENTS

| | | | |
|---|---|---|---|
| CN | 108141447 A | 6/2018 | |
| DE | 19823074 A1 | 11/1999 | |
| JP | 2008-131469 A | 6/2008 | |
| JP | 2008-236346 A | 10/2008 | |

OTHER PUBLICATIONS

International Search Report for PCT Application No. PCT/JP2020/017760, mailed on Sep. 7, 2020.
Written opinion for PCT Application No. PCT/JP2020/017760, mailed on Sep. 7, 2020.
3GPP TR 21.905: "Vocabulary for 3GPP Specifications", V15.0.0 (Mar. 2018).
3GPP TS 23.501: "System Architecture for the 5G System; Stage 2", V15.5.0 (Mar. 2019).
3GPP TS 23.502: "Procedures for the 5G System; Stage 2", V15.4.1 (Mar. 2019).
3GPP TR 23.761/S2-1901392: "Architectural enhancements for 5G multicast-broadcast services" (Jan. 2019).
CN Office Action for CN Application No. 202080032343.X, mailed on Dec. 1, 2023 with English Translation.
JP Office Communication for JP Application No. 2023-063378, mailed on May 21, 2024 with English Translation.
CN Office Action for CN Application No. 202080032343.X, mailed on Aug. 24, 2024 with English Translation.

* cited by examiner

CORE NETWORK NODE, UE, ACCESS NETWORK NODE AND CONTROLLING METHOD

This application is a National Stage Entry of PCT/JP2020/017760 filed on Apr. 24, 2020, which claims priority from European Patent Application 19172648.8 filed on May 3, 2019, the contents of all of which are incorporated herein by reference, in their entirety.

TECHNICAL FIELD

The present disclosure relates to a communication system. The disclosure has particular but not exclusive relevance to wireless communication systems and devices thereof operating according to the 3rd Generation Partnership Project (3GPP) standards or equivalents or derivatives thereof The disclosure has particular although not exclusive relevance to registration of multi-SIM user equipment (UE) in the so-called '5G' (or 'Next Generation') systems.

BACKGROUND ART

Background

3GPP SA2 Working Group has approved Study on System Enablers for multi-USIM devices (FS_MUSIM). Many commercially deployed devices support more than one USIM card (typically two). Multi-USIM devices typically address the following two use cases:
1) The user has both a personal and a business subscription and wishes to use them both from the same device. This use case has become popular with the BYOD initiatives in the enterprise world.
2) The user has multiple personal subscriptions and chooses which one to use based on the selected service (e.g. use one individual subscription and one "family circle" plan).

In either of the two use cases the USIMs may be from the same or from different MNOs.

Support for multi-USIM is currently handled in an implementation-specific manner without any support from 3GPP specifications, resulting in a variety of implementations and UE behaviors (e.g. Dual SIM Single Standby, Dual SIM Dual Standby, Dual SIM Dual Active, etc.).

With the increased complexity of 5G-capable UEs and with growing demand for multi-USIM devices in the market, it becomes urgent for 3GPP to consider system enhancements that would allow for more cost-efficient implementations in such devices The 3GPP SA2 agreed study in TR23.761 on system enablers for multi-USIM devices addresses the following objectives:
  A mechanism for delivering paging destined to USIM A while the UE is actively communicating with USIM B.
  A mechanism allowing for suspension (or release) and resumption of an ongoing connection in the 3GPP system associated with USIM A, so that the UE can temporarily leave to the 3GPP system associated with USIM B, and then return to the 3GPP system in a network-controlled manner. The study shall determine how the network handles MT data or MT control-plane activity occurrence on a suspended connection.
  A mechanism for avoidance of paging collisions occurring in the UE between USIM A and USIM B.
  Handling of emergency calls and sessions.
  Handling of service prioritization i.e. the study shall determine whether the UE behavior upon reception of paging information is driven by USIM configuration or user preferences or both.
  The study shall be restricted to single Rx/single Tx and dual Rx/single Tx UE implementations.
  The system enablers for multi-USIM devices are expected to apply for the cases where the multiple USIMs are owned by the same or by different MNOs.

SUMMARY OF INVENTION

Technical Problem

Problem Description

The multi-SIM study in 3GPP is restricted to single Rx/single Tx and dual Rx/single Tx UE implementations. However, the focus of the study is on enablers for multi-USIM implementations relying on common radio and baseband components that are shared among the multiple USIMs.

The question with such multi-SIM UEs is how they register, re-register and de-register with the network.

There are two alternatives:
1) Multi-SIM UE registers and/or deregister separately for each SIM. This alternative is with least impact to the network, however, it would incur increased signalling, especially when the number of the SIMs to register is higher. Also the registration process would take longer (i.e. introduces delays). Considering that the UEs re-register each time they change the registration area and they re-register periodically as well due to the expiry of the periodic registration timer, the increase from signalling and from delays could be unacceptable for the normal functioning of the multi-SIM UEs.
2) Multi-SIM UE registers and/or deregisters at the same time for more than 1 SIM. This alternative could considerably improve the registration process in terms of signalling and delays. It could especially be beneficial for the use cases where all the SIMs are from the same PLMN and can be supported by the same AMF (which is expected to be the most common deployment according the 3GPP multi SIM study). Such a registration for all SIMs at the same time requires some assistance from the network that involves standardisation changes, however, this kind of standardisation improvements (i.e. enablers) are actually the objective of the multi-SIM study work Item in 3GPP SA2 Working Group.

This document proposes a combined registration for multi-SIM UEs. The multi-SIM UE registers for more than 1 SIM or for all SIMs at the same time. It allows for considerably reduction in signalling and delays during registration and re-registration of multi-SIM UEs.

The use cases explored in this document are for 2 SIMs. However, the following embodiments are equally applicable for higher number of SIMs as well. The proposal uses the SIM notation which is equally applicable for (U)SIM notation or UICC notation.

Solution to Problem

According to an aspect of the present disclosure, a core network node for mobility management, includes: means for receiving, from user equipment, UE, configured to have multiple Subscriber Identity Modules, SIMs, a registration request message including user identities, each of which corresponds to one of the multiple SIMs; and means for performing a registration procedure of at least one of the user identities.

According to another aspect of the present disclosure, a core network node for mobility management, includes: means for receiving, from user equipment, UE, configured to have multiple Subscriber Identity Modules, SIMs, or a User Data Management, UDM, entity, a deregistration request message including user identities, each of which corresponds to one of the multiple SIMs; and means for performing a deregistration procedure of at least one of the user identities.

According to another aspect of the present disclosure, user equipment, UE, includes: means for maintaining multiple Subscriber Identity Modules, SIMs, means for transmitting a registration request message including multiple user identities, each of which corresponds to one of the multiple SIMs, to a core network node for mobility management; means for receiving a registration accept message including multiple temporary user identities each of which corresponds to one of user identities which are accepted by the core network node at a registration procedure; and means for performing registration procedure for each of the multiple temporary user identities included in the registration accept message.

According to another aspect of the present disclosure, an access network node, includes: means for receiving a configuration update message including information for indicating a capability to at least one of support for multi-Subscriber Identity Module, SIM, user equipment, UE, and support for at least one of multiple SIM combined registration and multiple SIM combined deregistration, from a core network node; and means for transmitting information indicating the at least one of support for multiple SIM UE and support for at least one of multiple SIM combined registration and multiple SIM combined deregistration, via System Information broadcast, to enable the UE to transmit a request regarding at least one of multiple SIM UE and at least one of multiple SIM combined registration and multiple SIM combined deregistration.

According to another aspect of the present disclosure, a controlling method for a core network node for mobility management, includes: receiving, from user equipment, UE, configured to have multiple Subscriber Identity Modules, SIMs, a registration request message including user identities, each of which corresponds to one of the multiple SIMs; and performing a registration procedure of at least one of the user identities.

According to another aspect of the present disclosure, a controlling method for a core network node for mobility management, includes: receiving, from user equipment, UE, configured to have multiple Subscriber Identity Modules, SIMs, or a User Data Management, UDM, entity, a deregistration request message including user identities, each of which corresponds to one of the multiple SIMs; and performing a deregistration procedure of at least one of the user identities.

According to another aspect of the present disclosure, a controlling method for User equipment, UE, includes: maintaining multiple Subscriber Identity Modules, SIMs, transmitting a registration request message including multiple user identities, each of which corresponds to one of the multiple SIMs, to a core network node for mobility management; receiving a registration accept message including multiple temporary user identities each of which corresponds to one of user identities which are accepted by the core network node at a registration procedure; and performing registration procedure for each of the multiple temporary user identities included in the registration accept message.

According to another aspect of the present disclosure, a controlling method for an access network node, includes: receiving a configuration update message including information for indicating a capability to at least one of support for multi-Subscriber Identity Module, SIM, user equipment, UE, and support for at least one of multiple SIM combined registration and multiple SIM combined deregistration, from a core network node; and transmitting information indicating the at least one of support for multiple SIM UE and support for at least one of multiple SIM combined registration and multiple SIM combined deregistration, via System Information broadcast, to enable the UE to transmit a request regarding at least one of multiple SIM UE and at least one of multiple SIM combined registration and multiple SIM combined deregistration.

Advantageous Effects of Invention

In certain aspects, a core network node, user equipment, an access network node, a controlling method for a core network node, a controlling method for User equipment, and a controlling method for an access network node may provide a technology for solving the problems as described above.

DESCRIPTION OF EMBODIMENTS

Detailed Description

Embodiment 1—Multi-SIM UE 3 Combined Registration to the Same PLMN and Same AMF 710

Use case—A UE 3 with SIM_A and SIM_B from the same PLMN registers with the same AMF 710 via combined multiple SIM (multi-SIM) registration, i.e. registers at the same time for SIM_A and SIM_B. A new registration type='multi-SIM' is used so that the AMF 710 is aware that the UE 3 is requesting for combined registration for multiple SIMs and the AMF 710 fetches the details for both SIM_A and SIM_B from the UDM 720 and the AMF 710 maintains a context for both SIM_A and SIM_B.

Figure 1:
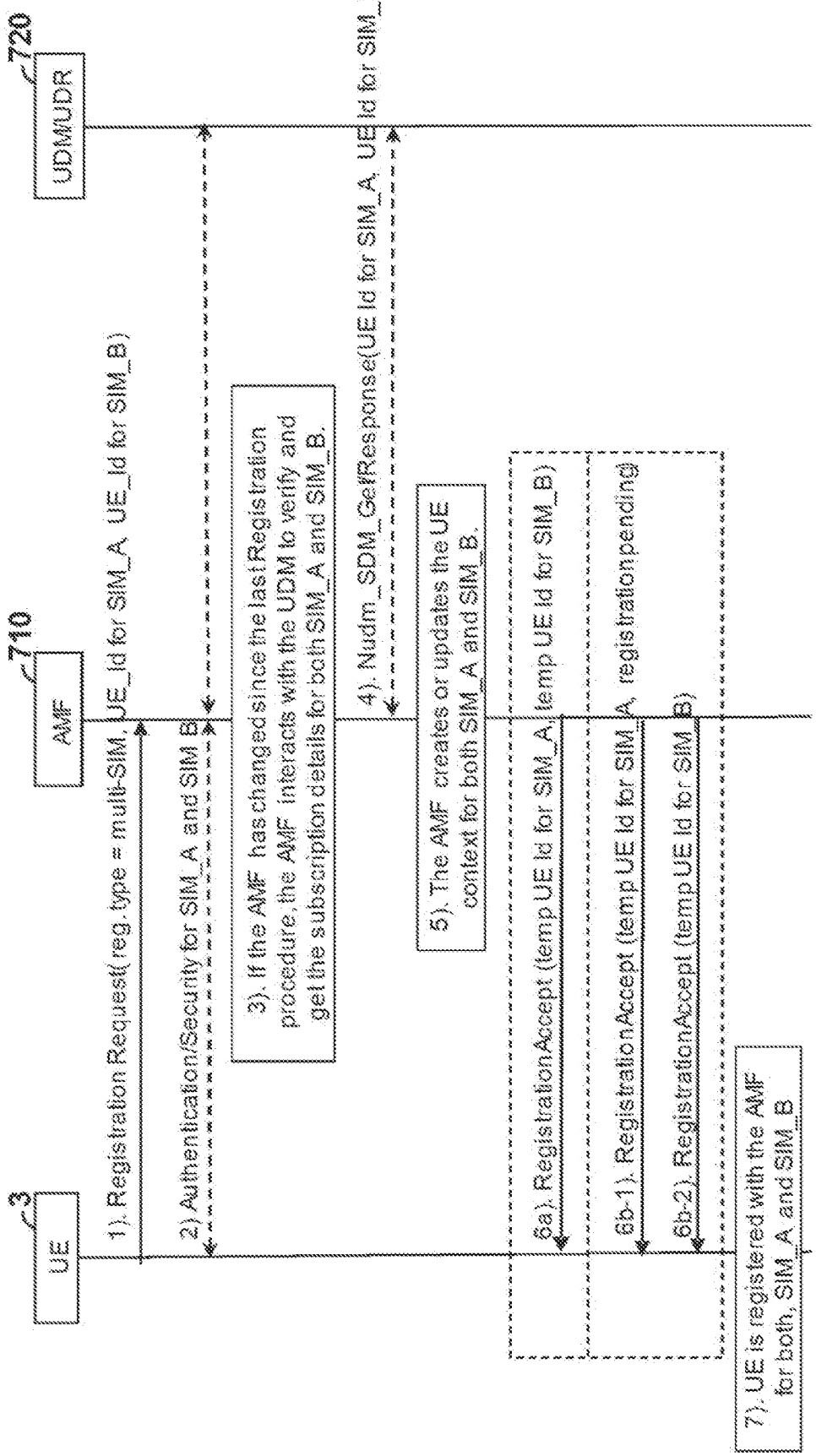
FIG. 1 illustrates schematically an exemplary procedure for combined registration of a multiple SIM UE to the same PLMN and AMF.

FIG. 1 illustrates schematically an exemplary procedure for combined registration of a multiple SIM UE 3 to the same PLMN and AMF 710.

The proposed multiple SIM UE 3 combined registration to the same PLMN and same AMF 710 in FIG. 1 includes the following steps:

1). Registration Request (registration type="multi-SIM", UE_Id for SIM_A, UE_Id for SIM_B)—Multi-SIM UE 3 requests a combined registration for SIM_A and SIM_B. The UE 3 includes in the Registration Request message, the UE Identities (UE_Ids) for SIM_A and SIM_B which can be SUPI, SUCI, 5G-GUTI, 5G-TMSI, PEI or any other notation to identify the UE 3 and/or UE's subscription identity. The UE 3 also includes in the Registration Request message, a new parameter 'multi-SIM' or any other notation for a parameter in order to indicate to the AMF 710, the intention or request from the UE 3 to register for multiple SIMs (e.g. SIM_A and SIM_B) at the same time. The Registration Request message has two kinds of parameters, some parameters are UE Id related such as Security parameters, Requested NSSAI, [Mapping Of Requested NSSAI], Default Configured NSSAI Indication, PDU Session status, List Of PDU Sessions To Be Activated, Follow-on request, MICO mode preference, [Requested Active Time], Requested DRX parameters, [extended idle mode DRX parameters], etc. The other parameters are non-UE Id related such as UE Radio Capability Update, UE MM Core Network Capability, etc.

In case that AMF 710 cannot recognize the registration type="multi-SIM", then the AMF 710 sends the Registration Reject message to the UE 3 with an existing cause value. For example, "Invalid mandatory information", "Information element non-existent or not implemented". This may happen in case that the AMF 710 is a Rel15 AMF. In this case the UE 3 sends separate Registration Request messages, one for SIM_A and another one for SIM_B.

2). Authentication/Security—The AMF 710 may run common authentication and security procedures for SIM_A and SIM_B as both SIM_A and SIM_B are connected to the same AMF 710 via single transceiver and single receiver so that both SIMs can share the same ciphering and encryption keys. However, the AMF 710 may verify User Identities via separate procedures for SIM_A and SIM_B. Alternatively, the AMF 710 may decide one ciphering and encryption key to be used out of the set of ciphering and encryption keys and be associated to both SIMs, SIM_A and SIM_B. Although the FIG. 1 shows one UDM/UDR 720, the AMF 710 may interwork with multiple UDM/UDRs 720 in case that each SIM is associated to different UDM/UDR 720.

3). If the AMF 710 has changed since the last registration procedure (e.g. the AMF 710 does not hold a valid UE context), the AMF 710 interacts with the UDM/UDR 720 to register the UE 3 and to retrieve the UE subscription and access mobility restriction details for both SIM_A and SIM_B. If the AMF 710 holds a valid UE context, the AMF 710 may verify the UE subscription details with the UDM/UDR 720.

The AMF 710 may contact the old AMF to retrieve UE contexts. In this case, Namf_Communication_UEContextTransfer (complete Registration Request) service is used. As the Namf_Communication_UEContextTransfer message contains the complete Registration Request message, the old AMF can populate multiple UE contexts into the Namf_Communication_UEContextTransfer response message for all SIMs set on Registration Request message.

4). Nudm_SDM_Get/Response (UE_Id for SIM_A, UE_Id for SIM_B)—As the registration type is multi-SIM registration, the AMF 710 requests the subscription details for both SIM_A and SIM_B. The AMF 710 may request the subscription and access and mobility restriction details for SIM_A and SIM_B from the UDM/UDR 720 via one procedure or via separate procedures for each subscription e.g. for SIM_A and SIM_B.

5). The AMF 710 creates or updates the UE context for both SIM_A and SIM_B. The AMF 710 may correlate SIM_A and SIM_B. This information, i.e. correlation, can be used by the AMF 710 for further processing, for example, paging SIM_A using a temporary ID for SIM_B.

If the AMF 710 finds out that some of the SIMs can be accepted by the AMF 710 but some of SIMs cannot, for example the AMF 710 cannot handle a certain requested S-NSSAI from SIM_B while all requested S-NSSAIs from SIM_A can be handled, the AMF 710 has a few options to take.

1) Reject registration message with new reject cause code: The AMF 710 sends the Registration Reject message to the UE 3 with a new cause value "separate registration required". Once the UE 3 receives this Registration Reject message, the UE 3 sends separate Registration Request messages, one for SIM_A and another one for SIM_B.

2) Partially accepted. In this case the AMF 710 sends the Registration Accept message to the UE 3 with a clear indication which SIMs are accepted by this registration procedure. Then, the UE 3 sends another registration request message to the network with SIMs that are not yet accepted by the network.

6a). Registration Accept (temporary UE_Id for SIM_A, temporary UE_Id for SIM_B)—The AMF 710 sends a Registration Accept message to the UE 3 indicating that the Registration Request has been accepted. The AMF 710 confirms the registration of the UE 3 for each SIM e.g. SIM_A and SIM B by allocating a new temporary ID (e.g. 5G-GUTI or 5G-TMSI) for each SIM e.g. SIM A and SIM_B. If no 5G-GUTI is included in the Registration Accept, then the UE 3 uses the 5G-GUTI assigned for the existing registration also for the new registration.

In case some of the registration parameters for SIM_A and SIM_B are different, the AMF 710 may provide different registration parameters (e.g. allowed S-NSSAIs, DRX, Periodic Update timer, access and mobility restrictions and etc) for SIM_A and SIM_B within the same Registration Accept message.

The AMF 710 may set a single value for DRX, Periodic Update timer in case that SIM_A and SIM_B have a different DRX value or/and Periodic Update timer value. For example, the AMF 710 can set the most frequent DRX value to all SIMs if the AMF 710 can perform the MT call processing taking multi SIMs into account. i.e. SIM_B can be paged by a temporary ID for SIM_A. The AMF 710 can set both SIM_A and SIM_B as RM-REGISTERED state at this point.

At this point, a N2 message, that carries the Registration Accept message, may also have UE related parameters. Some of the N2 parameters for SIMA and SIM_B may be different, and the AMF 710 may provide different parameters (e.g. 5G-GUTI or 5G-TMSI, allowed S-NSSAIs and etc) for SIM_A and SIM_B within the same N2 message.

6b). Alternatively, if the registration parameters for SIM_A and SIM_B differ (e.g. the AMF 710 allocates different allowed network slices (S-NSSAIs) for SIM_A and SIM_B, different DRX cycles, different periodic update timers, or different access and mobility restrictions for SIM_A and SIM_B), the AMF 710 may confirm the registration for SIM_A and SIM_B with separate Registration Accept messages, e.g. a Registration Accept message for SIM_A and another Registration Accept message for SIM_B. In this case the AMF 710 may indicate in the first Registration Accept message with parameter(s), e.g. 'registration pending' or any other notation for a parameter to indicate that the registration is not finished yet and another Registration Accept message is expected.

7). The UE 3 is registered with one AMF 710 from the same PLMN for both, SIMA and SIM_B via combined multi-SIM registration and the UE 3 maintains the registration for both SIM_A and SIM_B. In case the AMF 710 confirms the registration for SIM_A and for SIM_B in separate Registration Accept messages, i.e. the UE 3 receives registration confirmation for SIM_A and the 'registration pending' indication, the UE 3 starts a timer (e.g. a timer called 'registration pending' or any other notation for a timer with a purpose to delay the UE 3 moving to Idle mode while the multi-SIM registration is still pending) in order to wait for the SIM_B registration confirmation before moving to Idle mode.

This Use case can trigger a registration procedure on both, over 3GPP access and over non-3GPP access.

In the description above, the Registration Request at step 1) includes the "multi-SIM" parameter. However, this parameter can be optional. If the "multi-SIM" parameter or its equivalent is not included in the Registration Request message, the AMF 710 determines, based on the number of UE_Ids for different SIMs, whether this Registration Request is for single SIM or Multi-SIM registration. If the Registration Request message includes UE_Id for SIM_A and UE_Id for SIM_B, then the AMF 710 recognizes that this is the multi-SIM registration case and proceeds to the step 2) and further.

The new parameter 'multi-SIM' can be used by the UE 3 to indicate different use cases. For example, when the 'multi-SIM' parameter is "0" or "False", it indicates for any use case with "single-SIM" UE and when the 'multi-SIM' parameter is "1" or "True", it indicates for any use case with "multi-SIM" UE. Another alternative use for the 'multi-SIM' parameter is to indicate the number of the SIMs in the UE 3.

The description above demonstrates an example for a use case of an UE 3 with two SIMs. This concept can be applied for the case of an UE 3 with three or more SIMs as well.

Embodiment 2—Multi-SIM UE 3 Combined Registration to Same PLMN but Different AMFs 710

Use case—A UE 3 with SIM_A and SIM_B from the same PLMN registers with different AMFs 710 via combined multi-SIM registration. This may apply when SIM_A and SIM_B need to be served by different AMFs 710 (e.g. SIM_A and SIM_B are subscribed to different mutually exclusive network slices). In this use case, the UE 3 registers for SIM_A with the AMF_1 710-1 and for SIM_B with the AMF_2 710-2. The registration with the AMF_1 710-1 and the AMF_2 710-2 may be confirmed with separate Registration Accept messages.

Figure 2:
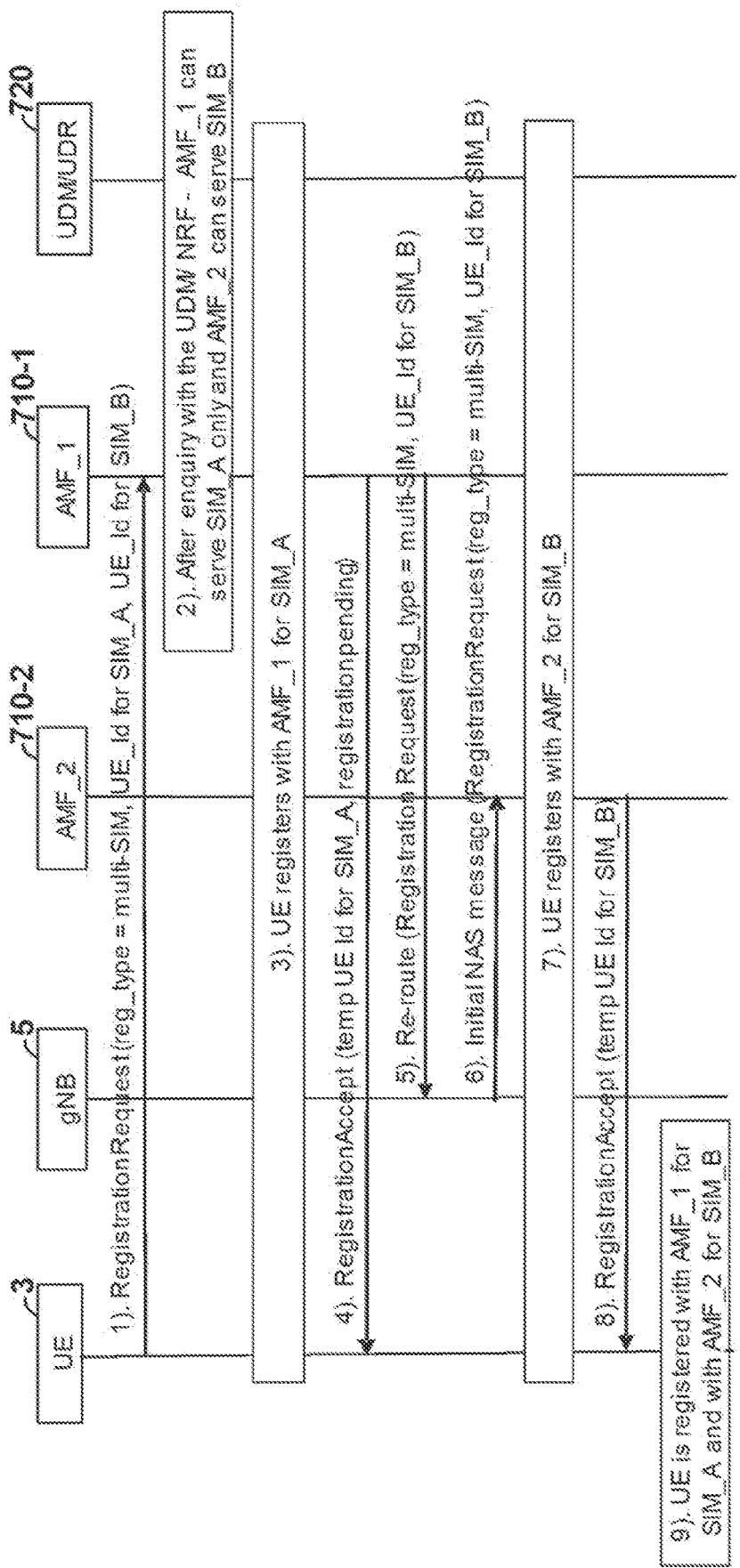
FIG. 2 illustrates schematically an exemplary procedure for combined registration of a multiple SIM UE to the same PLMN but different AMFs.

FIG. 2 illustrates schematically an exemplary procedure for combined registration of a multiple SIM UE 3 to the same PLMN but different AMFs 710-1 and 710-2.

The proposed multiple SIM UE 3 combined registration to the same PLMN but different AMFs 710-1 and 710-2 in FIG. 2 includes the following steps:

1). Registration Request (registration type="multi-SIM", UE_Id for SIM_A, UE_Id for SIM_B) —The multi-SIM UE 3 requests a combined registration for SIM_A and SIM_B. The UE 3 includes in the Registration Request message, the UE Identities (UE_Ids) for SIM_A and SIM_B which can be SUPI, SUCI, 5G-GUTI, 5G-TMSI, PEI or any other notation to identify the UE 3 and/or UE's subscription identity. The UE 3 also includes in the Registration Request message, a new parameter 'multi-SIM' or any other notation for a parameter in order to indicate to the AMF 710 the intention or request from the UE 3 to register for multiple SIMs (e.g. SIM_A and SIM_B) at the same time.

2). After enquiry with the UDM/UDR 720 and/or NRF, the AMF_1 710-1 finds out that it can serve the UE 3 for SIM_A only and the AMF_2 710-2 can serve the UE 3 for SIM_B. The reason for this result could be the case where SIM_A and SIM_B are subscribed to different network slices (e.g. S-NSSAIs) i.e. the SIM_A and SIM_B cannot be served by the same AMF 710.

3). The UE 3 registers for SIM_A with the AMF_1 710-1.

4). Registration Accept (temporary UE_Id for SIMA, registration pending)—The AMF_1 710-1 confirms the registration of the UE 3 for SIM_A. As the registration of the UE 3 for SIM_B is still pending the AMF_1 710-1 may indicate this to the UE 3 by adding the 'registration pending' parameter in the Registration Accept message or any other notation for a parameter to indicate that the registration is not finished yet and another Registration Accept message is expected. When the UE 3 receives registration confirmation for SIM_A and the 'registration pending' indication, the UE 3 starts a timer (e.g. a timer called 'registration pending' or any other notation for a timer with a purpose to delay the UE 3 moving to Idle mode while the multi SIM registration is still pending) in order to wait for the SIM_B registration confirmation before moving to Idle mode.

5). Re-route (Registration Request (registration type="multi-SIM", UE_Id for SIM_B))—AMF_1 710-1 reroutes the Registration Request from the UE 3 for SIM_B to the AMF_2 710-2 via the RAN Node (e.g. gNB 5).

6). Initial NAS message (Registration Request (registration type="multi-SIM", UE_Id for SIM_B))—The gNB 5 forwards the Registration request from the UE 3 for SIM_B to the AMF_2 710-2.

7). The UE 3 registers for SIM_B with the AMF_2 710-2.

8). Registration Accept (temporary UE_Id for SIM_B)—The AMF_2 710-2 confirms the registration of the UE 3 for SIM_B.

9). The UE 3 is registered with the AMF_1 710-1 for SIM_A and with the AMF_2 710-2 for SIM_B.

The UE 3 may send a Registration Acknowledge message to both the AMF_1 710-1 and the AMF_2 710-2 or one for the AMF_1 10-1 and another for the AMF_2 710-2.

As an alternative of embodiment 2, the following steps can be taken.

1). Registration Request (registration type="multi-SIM", UE_Id for SIM_A, UE_Id for SIM_B)—The multi-SIM UE 3 requests a combined registration for SIM_A and SIM_B. The UE 3 includes in the Registration Request message, the UE Identities (UE_Ids) for SIM_A and SIM_B which can be SUPI, SUCI, 5G-GUTI, 5G-TMSI, PEI or any other notation to identify the UE 3 and/or UE's subscription identity. The UE 3 also includes in the Registration Request message, a new parameter 'multi-SIM' or any other notation for a parameter in order to indicate to the AMF 710 the intention or request from the UE 3 to register for multiple SIMs (e.g. SIM_A and SIM_B) at the same time.

2). After enquiry with the UDM/UDR 720 and/or NRF, the AMF_1 710-1 finds out that it can serve the UE 3 for SIM_A only and the AMF_2 710-2 can serve the UE 3 for SIM_B. The reason for this result could be the case where SIM_A and SIM_B are subscribed to different network slices (e.g. S-NSSAIs) that are mutually exclusive i.e. the SIMA and SIM_B cannot be served by the same AMF 710.

3). The UE 3 registers for SIM_A with the AMF_1 710-1.

4). The AMF_1 710-1 does not send the Registration Accept message to the UE 3.

5). The AMF_1 710-1 reroutes the entire Registration Request message as received in step 1 together with a Registration Accept message for the SIM_A. This message may have a parameter that indicates successfully registration for SIM_A with the AMF_1 710-1.

6). Initial NAS message (Registration Request (registration type="multi-SIM", UE_Id for SIM_B))—The gNB 5 forwards the Registration Request from the UE 3 to the AMF_2 710-2 with additional N2 messages for SIM_A.

7). The UE 3 registers for SIM_B with the AMF_2 710-2.

8). Registration Accept (temporary UE_Id for SIM_A, temporary UE_Id for SIM_B)—The AMF_2 710-2 confirms the registration of the UE 3 for SIM_A and SIM_B.

9). The UE 3 is registered with the AMF_1 710-1 for SIM_A and with the AMF_2 710-2 for SIM_B.

The UE 3 may send a Registration Acknowledge message to both the AMF_1 710-1 and the AMF_2 710-2 or one for the AMF_1 710-1 and the other one for the AMF_2 710-2.

In the description above, the Registration Request message at the step 1) includes the "multi-SIM" parameter. However, this parameter can be optional. If the "multi-SIM" parameter or its equivalent is not included in the Registration Request message, the AMF 710 determines, based on the number of UE_Ids for different SIMs, whether this Registration Request is for single SIM or Multi-SIM registration. If the Registration Request includes UE_Id for SIM_A and UE_Id for SIM_B, then AMF 710 recognizes this is the Multi-SIM registration case and proceeds to the step 2) and further.

The new parameter 'multi-SIM' can be used by the UE 3 to indicate different use cases. For example, when the 'multi-SIM' parameter is "0" or "False", it indicates for any use case with "single-SIM" UE and when the 'multi-SIM' parameter is "1" or "True", it indicates for any use case with "multi-SIM" UE. Another alternative use for the 'multi-SIM' parameter is to indicate the number of the SIMs in the UE 3.

The description above demonstrates an example for a use case of an UE 3 with two SIMs. This concept can be applied for the case of an UE 3 with three or more SIMs as well.

Embodiment 3—Multi-SIM UE 3 Combined Registration to Same PLMN but Different RATs Use case—A dual mode UE 3 (LTE & 5G) with SIM_A and SIM_B from the same PLMN registers for 5G and LTE via combined registration. The UE 3 first registers for SIM_A with the AMF 710 on 5G. Then the AMF 710 triggers the Attach Request procedure to the MME 730 in order to register the UE 3 for SIM_B with the MME 730 on LTE. The AMF 710 confirms to the UE 3 the registration of SIM_A on 5G and SIM_B on LTE.

Figure 3:
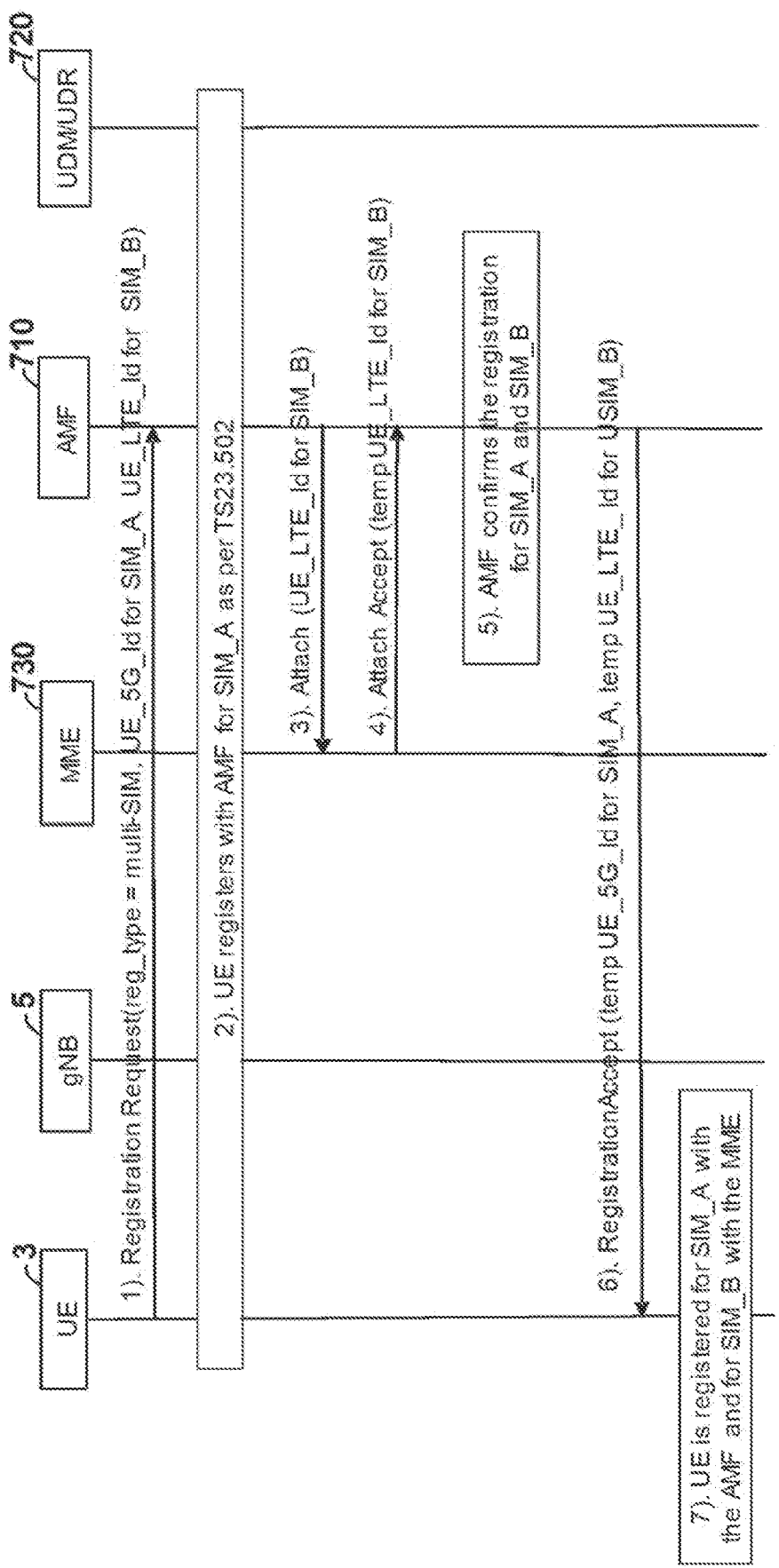
FIG. 3 illustrates schematically an exemplary procedure for combined registration of a Multiple SIM UE to the same PLMN but different RATs.

FIG. 3 illustrates schematically an exemplary procedure for combined registration of a Multiple SIM UE 3 to the same PLMN but different RATs.

The proposed multiple SIM UE 3 combined registration to the same PLMN but different RATs in FIG. 3 includes the following steps:

1). Registration Request (registration type="multi-SIM", UE_5G_Id for SIM_A, UE_LTE_Id for SIM_B)—The multi-SIM UE 3 requests a combined registration for SIM_A on 5G and for SIM_B on LTE. The UE 3 includes in the Registration Request message the UE's 5G Identity for SIM_A which can be SUPI, SUCI, 5G-GUTI, 5G-TMSI, PEI or any other notation to identify the UE 3 and/or UE's subscription identity for 5G and UE's LTE Identity for SIM_B which can be IMSI, S-TMSI, 4G-GUTI or any other notation to identify the UE 3 and/or UE's subscription identity for LTE. The UE 3 also includes in the Registration Request message, a new parameter 'multi-SIM' or any other notation for a parameter in order to indicate to the AMF 710 the intention or request from the UE 3 to register for multiple SIMs (e.g. SIM_A and SIM_B) at the same time.

2). The UE 3 registers with the AMF 710 for SIM_A as per 5G registration procedure in TS23.502.

3). Attach (UE_LTE_Id for SIM_B)—The AMF 710 triggers an Attach Request procedure to the MME 730 for SIM_B. The AMF 710 includes in the Attach Request message the UE identity (UE_Id) for LTE which can be IMSI, S-TMSI or 4G-GUTI.

4). Attach Accept (temporary UE_LTE_Id for SIM_B)—The MME 730 registers the UE 3 for LTE and confirms the registration for SIM_B with the Attach Accept message back to the AMF 710. The MME 730 may allocate a new LTE temporary UE_Id, e.g. S-TMSI or 4G-GUTI.

5). The AMF 710 confirms the registration for SIM_A and SIM_B.

6). Registration Accept (temporary UE_5G_Id for SIM_A, temporary UE_LTE_Id for USIM_B)—The AMF 710 confirms the registration for SIM_A with the AMF 710 on 5G and for SIM_B with the MME 730 on LTE with the Registration Accept message. The UE 3 may be allocated a new temporary 5G ID which can be 5G-GUTI or 5G-TMSI and a temporary LTE ID which can be S-TMSI or 4G-GUTI.

7). UE 3 is registered for SIM_A with the AMF 710 on 5G and for SIM_B with the MME 730 on LTE with a combined Registration procedure.

In the description above, Registration Request message at the step 1) includes the "multi-SIM" parameter. However, this parameter can be optional. If the "multi-SIM" parameter or its equivalent is not included in the Registration Request message, the AMF 710 determines, based on the number of UE_Ids for different SIMs, whether this Registration Request is for single SIM or Multi-SIM registration. If the Registration Request includes UE_Id for SIM_A and UE Id for SIM_B, then the AMF 710 recognizes this is the Multi-SIM case and proceeds to the step 2) and further.

The new parameter 'multi-SIM' can be used by the UE 3 to indicate different use cases. For example, when the 'multi-SIM' parameter is "0" or "False", it indicates for any use case with "single-SIM" UE and when the 'multi-SIM' parameter is "1" or "True", it indicates for any use case with "multi-SIM" UE. Another alternative use for the 'multi-SIM' parameter is to indicate the number of the SIMs in the UE 3.

The description above demonstrates an example for a use case of an UE 3 with two SIMs. This concept can be applied for the case of an UE 3 with three or more SIMs as well.

Embodiment 4—Multi-SIM UE 3 Combined De-Registration from the Same PLMN and AMF 710

Use case 1 (Multi-SIM UE 3 requested combined deregistration)—A UE 3 with SIM_A and SIM_B from the same PLMN is registered with the same AMF 710. The UE 3 requests combined deregistration procedure e.g. deregistration for SIM_A and SIM_B. The network deregisters both SIM_A and SIM_B within the same deregistration procedure.

Figure 4:
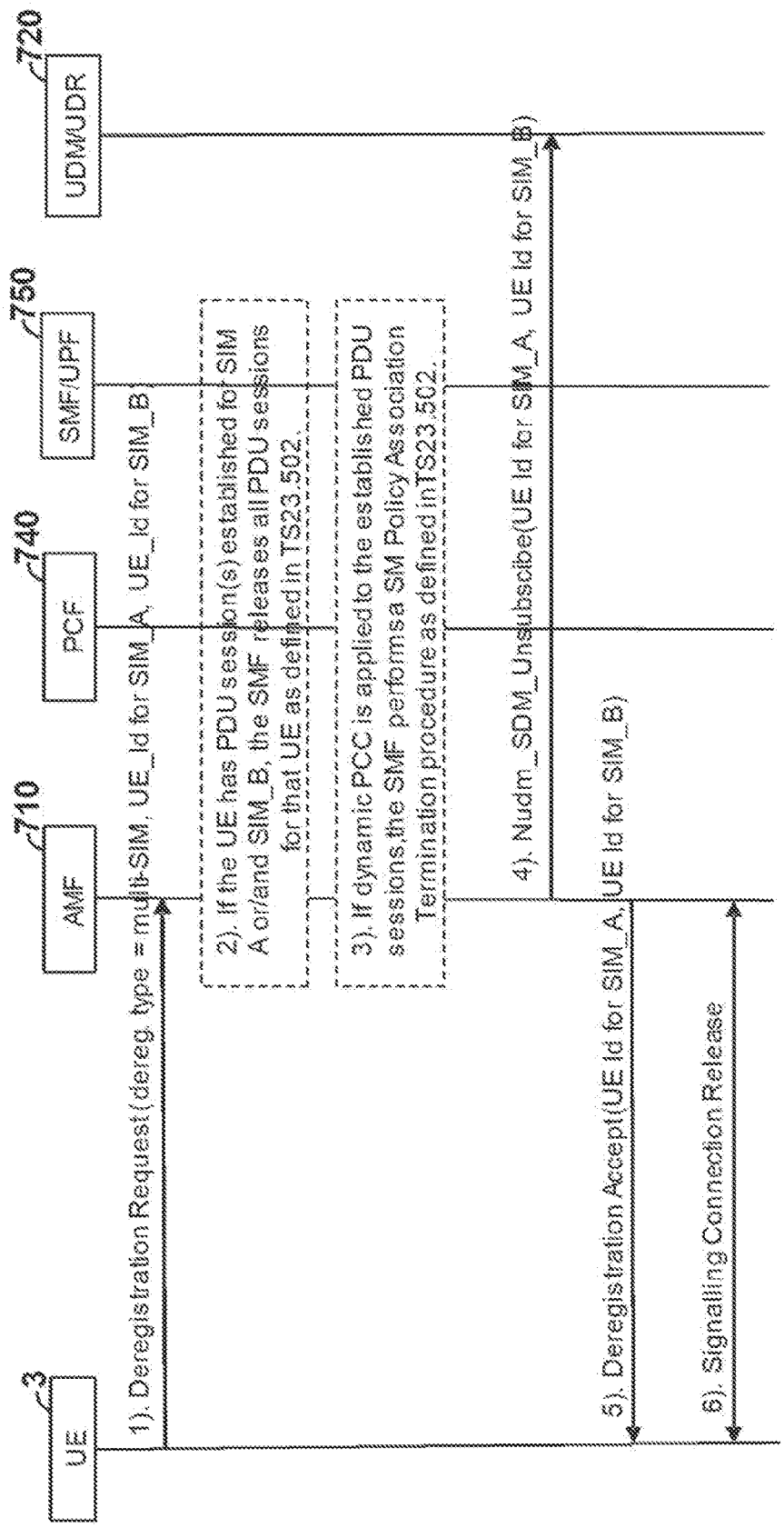
FIG. 4 illustrates schematically an exemplary procedure for combined deregistration of a Multiple SIM UE from the same PLMN and AMF.

FIG. 4 illustrates schematically an exemplary procedure for combined deregistration of a Multiple SIM UE 3 from the same PLMN and the AMF 710—use case 1.

The proposed multiple SIM UE 3 combined deregistration from the same PLMN and the same AMF 710 (use case 1) in FIG. 4 includes the following steps:

1). Deregistration Request (deregistration type="multi-SIM", UE_Id for SIM_A, UE_Id for SIM_B)—The multi-SIM UE 3 requests a combined deregistration for SIM_A and SIM_B. The UE 3 includes in the Deregistration Request the UE Identities (UE_Ids) for SIM_A and SIM_B which can be SUPI, SUCI, 5G-GUTI, 5G-TMSI, PEI or any other notation to identify the UE 3 and/or UE's subscription identity. The UE 3 also includes in the Deregistration Request message, a new parameter 'multi-SIM' or any other notation for a parameter in order to indicate to the AMF 710 the intention or request from the UE 3 to deregister for multiple SIMs (e.g. SIM_A and SIM_B) at the same time.

2). If the UE 3 has PDU session(s) established for SIM A or/and SIM_B, the SMF 750 releases all PDU sessions for that UE 3 as defined in TS23.502.

3). If dynamic PCC is applied to the established PDU sessions, the SMF 750 performs a SM Policy Association Termination procedure as defined in TS23.502.

4). Nudm_SDM_Unsubscribe (UE_Id for SIM_A, UE_Id for SIM_B).

5) Deregistration Accept (UE_Id for SIM_A, UE_Id for SIM_B)—The AMF 710 sends a NAS message, Deregistration Accept, to the UE 3 depending on the deregistration type i.e. if deregistration type is "switch-off", the AMF 710 does not send the Deregistration Accept message.

6). Signalling Connection Release—the AMF 710 sends a N2 UE Release command to the NG-RAN with the Cause set to Deregistration to release a N2 signalling connection.

In case that the UE 3 initiate the Deregistration procedure for one SIM, then the Deregistration procedure as defined in the 3GPP TS 23.502[3] takes place except:

The purge procedure does not start at the AMF 710 since the AMF 710 still manages the other SIMs.

In the description above, the Registration Request at the step 1) includes the "multi-SIM" parameter. However, this parameter can be optional. If the "multi-SIM" parameter or its equivalent is not defined in the Registration Request, the AMF 710 determines, based on the number of UE_Ids for different SIMs, whether this Registration Request is for single SIM or Multi-SIM registration. If the Registration Request includes UE_Id for SIM_A and UE_Id for SIM_B, then AMF 710 recognizes this is Multi-SIM case and proceeds to the step 2) and further.

In the description above, the Deregistration Request of the step 1) includes the "multi-SIM" parameter. However, the parameter can be optional. If the "multi-SIM" parameter or correspondence is not defined in the Deregistration Request, the AMF 710 determine, based on the number of UE_id for difference SIMs, whether this Registration Request is for single SIM or Multi-SIM. If the Deregistration Request includes UE_Id for SIM_A and UE_Id for SIM_B, then AMF 710 recognizes this is Multi-SIM case and processes the step 2) and afterward.

The new parameter 'multi-SIM' can be used by the UE 3 to indicate different use cases. For example, when the 'multi-SIM' parameter is "0" or "False", it indicates for any use case with "single-SIM" UE 3 and when the 'multi-SIM' parameter is "1" or "True", it indicates for any use case with "multi-SIM" UE 3. Another alternative use for the 'multi-SIM' parameter is to indicate the number of the SIMs in the UE 3.

The description above demonstrates an example for a use case of an UE 3 with two SIMs. This concept can be applied for the case of an UE 3 with three or more SIMs as well.

Use case 2 (Network requested combined deregistration)—A UE 3 with SIM_A and SIM_B from the same PLMN is registered with the same AMF 710. The network requests combined deregistration procedure i.e. deregistration for SIM_A and SIM_B. The network deregisters both SIM_A and SIM_B within the same network initiated deregistration procedure.

Figure 5:
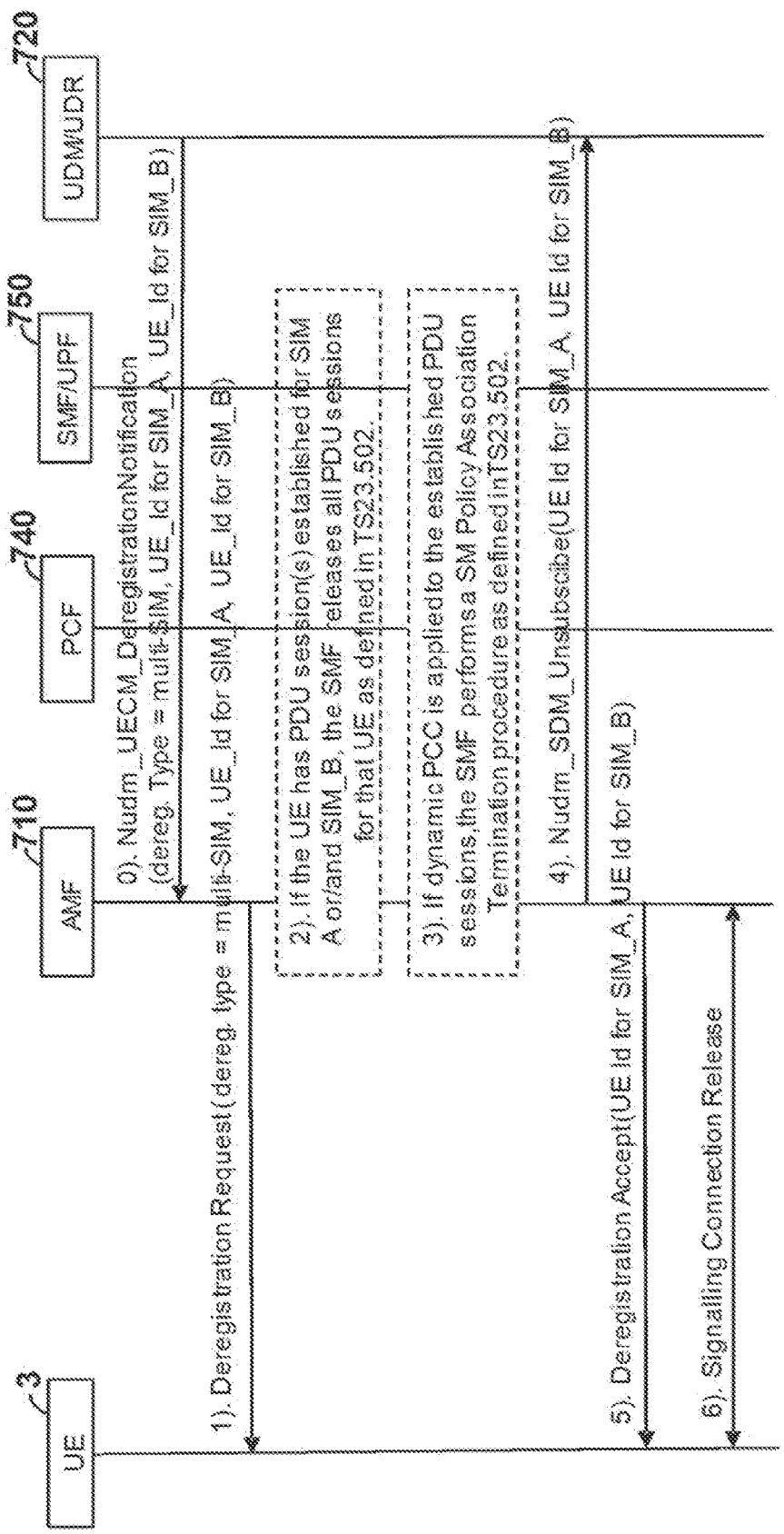
FIG. 5 illustrates schematically an exemplary procedure for combined deregistration of a Multiple SIM UE from the same PLMN and AMF.

FIG. 5 illustrates schematically an exemplary procedure for combined deregistration of a Multiple SIM UE 3 from the same PLMN and the AMF 710—use case 2.

The proposed multiple SIM UE 3 combined deregistration from the same PLMN and the same AMF 710 (use case 2) in FIG. 5 includes the following steps:

0). Nudm_UECM_Deregistration Notification (UE_Id for SIM_A, UE_Id for SIM_B)—If the UDM/UDR 720 wants to request the immediate deletion of all subscriber's registration contexts for a multi-SIM UE 3 and PDU Sessions, the UDM/UDR 720 shall send a Nudm_UECM_DeregistrationNotification message to the AMF 710 including the UE_Ids for SIM_A and SIM_B and a parameter deregistration type="multi-SIM". The UDM 720 includes in the Deregistration Notification, the UE Identities (UE_Ids) for SIM_A and SIM_B which can be SUPI, SUCI, 5G-GUTI, 5G-TMSI, PEI or any other notation to identify the UE 3 and/or UE's subscription identity. The UDM/UDR 720 also includes in the Deregistration Request message, a new parameter 'multi-SIM' or any other notation for a parameter in order to indicate to the AMF 710 the intention or request from the UDM/UDR 720 to deregister for multiple SIMs (e.g. SIM_A and SIM_B) at the same time.

1). Deregistration Request (deregistration type="multi-SIM", UE_Id for SIM_A, UE_Id for SIM_B).

The AMF 710 initiated Deregistration procedure is either explicit or implicit. The AMF 710 does not send the Deregistration Request message to the UE 3 for Implicit Deregistration. If the UE 3 is in CM-CONNECTED state, the AMF 710 may explicitly deregister the UE 3 by sending a Deregistration Request message to the UE 3. The AMF 710 includes the UE_Id for SIM_A and UE_Id for SIM_B to indicate deregistration for both SIMs at the same time. The AMF 710 may also set the deregistration type to 'multi-SIM' in order to indicate deregistration for multiple SIMs at the same time. If the Deregistration Request message is sent over 3GPP access and the UE 3 is in CM-IDLE state in 3GPP access, the AMF 710 pages the UE 3.

2). If the UE 3 has PDU session(s) established for SIM_A or/and SIM_B, the SMF 750 releases all PDU sessions for that UE 3 as defined in TS23.502.

3). If dynamic PCC is applied to the established PDU sessions, the SMF 750 performs a SM Policy Association Termination procedure as defined in TS23.502.

4). Nudm_SDM_Unsubscibe (UE_Id for SIMA, UE_Id for SIM_B).

5) Deregistration Accept (UE_Id for SIM_A, UE_Id for SIM_B)—The AMF 710 sends a NAS message, Deregistration Accept, to UE 3 depending on the Deregistration type i.e. if Deregistration type is "switch-off", the AMF 710 does not send a Deregistration Accept message.

6) Signalling Connection Release—the AMF 710 sends a N2 UE Release command to the NG-RAN with the Cause set to Deregistration to release a N2 signalling connection.

In case that the UE 3 initiate the Deregistration procedure for one SIM, then the Deregistration procedure as defined in the 3GPP TS 23.502[3] takes place except:

The purge procedure does not start at the AMF 710 since the AMF 710 still manages the other SIMs.

The new parameter 'multi-SIM' can be used by the UE 3 to indicate different use cases. For example, when the 'multi-SIM' parameter is "0" or "False", it indicates for any use case with "single-SIM" UE and when the 'multi-SIM' parameter is "1" or "True", it indicates for any use case with "multi-SIM" UE. Another alternative use for the 'multi-SIM' parameter is to indicate the number of the SIMs in the UE 3.

The description above demonstrates an example for a use case of an UE 3 with two SIMs. This concept can be applied for the case of an UE 3 with three or more SIMs as well.

In the description above, Nudm_UECM_Deregistration Notification at the step 0) and Deregistration Request at the step 1) include the "multi-SIM" parameter. However, this parameter can be optional. If the "multi-SIM" parameter or its equivalent one is not defined in the messages, the AMF 710 or the UE 3 determines, based on the number of UE Ids for different SIMs, whether this Registration Request is for single SIM or Multi-SIM.

Embodiment 5—Multiple SIM Combined Registration/Deregistration Support Indication in SI Broadcast Use case—For multi-SIM UE 3 with capability for combined multi-SIM registration/deregistration (e.g. registration/deregistration for SIM_A and SIM_B in one go), it is required that the UE 3 is aware of whether the network supports multiple SIMs feature and/or supports combined multi-SIM registration/deregistration feature. The network support for multi-SIM UEs and/or combined multi-SIM registration/deregistration can be indicated via the 'multi-SIM support indication' or/and 'multi-SIM registration/deregistration support' indication in the System Information (SI) broadcast.

Figure 6:
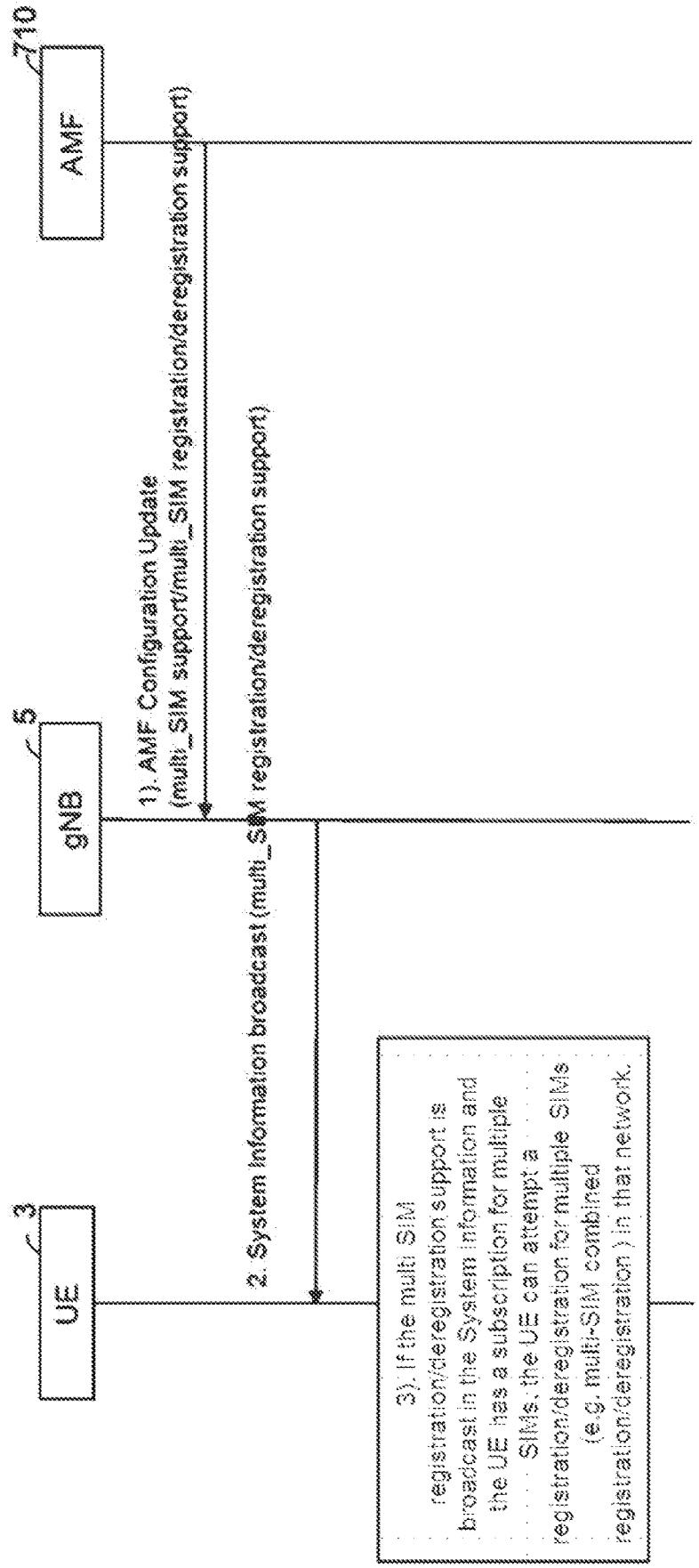
FIG. 6 illustrates schematically an exemplary procedure for Multiple SIM Support indication and/or Multiple SIM combined registration/deregistration support indication in the SI broadcast.

FIG. 6 illustrates schematically an exemplary procedure for the Multiple SIM Support indication and/or Multiple SIM combined registration/deregistration support indication in the SI broadcast.

The proposed support for multiple SIM UEs and/or support for multi-SIM combined registration/deregistration by the network indication in the SI broadcast in FIG. 6 includes the following steps:

1). AMF Configuration Update message (multi_SIM support/multi_SIM registration/deregistration support)—If the network supports Multiple-SIM UEs or/and multi-SIM UE combined registration/deregistration, the AMF 710 indicates the network capability to support multi-SIM UEs or/and support for multi-SIM combined registration/deregistration to the RAN Node with the AMF Configuration Update message or any other message on the AMF/gNB interface.

2). System Information broadcast (multi_SIM support/multi_SIM registration/deregistration support)—If the RAN Node (e.g. gNB 5) is configured for multi-SIM UE support or/and support for multi-SIM UE combined registration/deregistration feature, the RAN Node broadcasts the network support for multi-SIM UE or/and the network support for multi-SIM combined registration/deregistration feature in one of the System Information messages.

3). If a support for multi-SIM UE or/and a support for multi-SIM UE registration/deregistration is broadcast in one of the System Information messages and the UE 3 has a subscription for multiple SIMs and/or the UE 3 is capable for Multi SIM combined registration/deregistration, the UE 3 can attempt a registration/deregistration for multiple SIMs and/or for multi-SIM combined registration/deregistration in that network.

SUMMARY

Beneficially, the above described aspects include, although they are not limited to, one or more of the following functionalities:

1) Combined multi-SIM registration to the same AMF 710 and PLMN by multi-SIM UEs 3.

2) Combined multi-SIM deregistration from the same AMF 710 and PLMN by multi-SIM UEs 3.

3) Combined multi-SIM registration to different AMFs 710-1/710-2 from the same PLMN by multi-SIM UEs 3.

4) Combined multi-SIM registration to different RATs from the same PLMN by multi-SIM UEs 3.

5) Registration pending indication when the combined multi-SIM registration is confirmed individually per each SIM.

6) Multi-SIM support indication and/or multi-SIM combined registration/deregistration support indication broadcast by the network via System Information.

7) Combined multi-SIM deregistration support by the network broadcast via System Information.

In order to provide these functionalities, the above aspects describe exemplary methods comprising (at least some of) the following steps:

Embodiment 1—Multi-SIM UE 3 Combined Registration to the Same PLMN and Same AMF 710

1) The UE 3 triggers combined registration for multiple SIMs with same PLMN at the same time.
2) The UE 3 is confirmed for registration for multiple SIMs with the same AMF 710 and same PLMN at the same time or individually per each SIM.

Embodiment 2—Multi-SIM UE 3 combined registration to the same PLMN and different AMFs 1) The UE 3 triggers combined registration for multiple SIMs with different AMF 710 and same PLMN at the same time.
2) The UE 3 is confirmed for registration for multiple SIMs at the same time or individually per each SIM.

Embodiment 3—Multi-SIM UE 3 Combined Registration to the Same PLMN and Different RATs 1) The UE 3 triggers combined registration for multiple SIMs from different RAT and same PLMN.
2) The UE 3 is confirmed for registration for multiple SIMs for 5G and LTE at the same time.

Embodiment 4—Multi-SIM UE 3 combined deregistration from the same PLMN and AMF 710

1) The UE 3 triggers combined deregistration for multiple SIMs from the same PLMN.
2) The UE 3 is deregistered for multiple SIMs at the same time.

Embodiment 5—Multiple SIM Combined Registration/Deregistration Support Indication in SI Broadcast 1) The RAN Node broadcasts of multi-SIM UE 3 support indication and/or multi-SIM UE 3 combined registration/deregistration support indication in the SI broadcast messages.

Benefits

This disclosure proposes a combined registration for multi SIM UEs which allows for reduced signaling and reduced delay at registration and re-registration procedures.

System Overview

Figure 7:
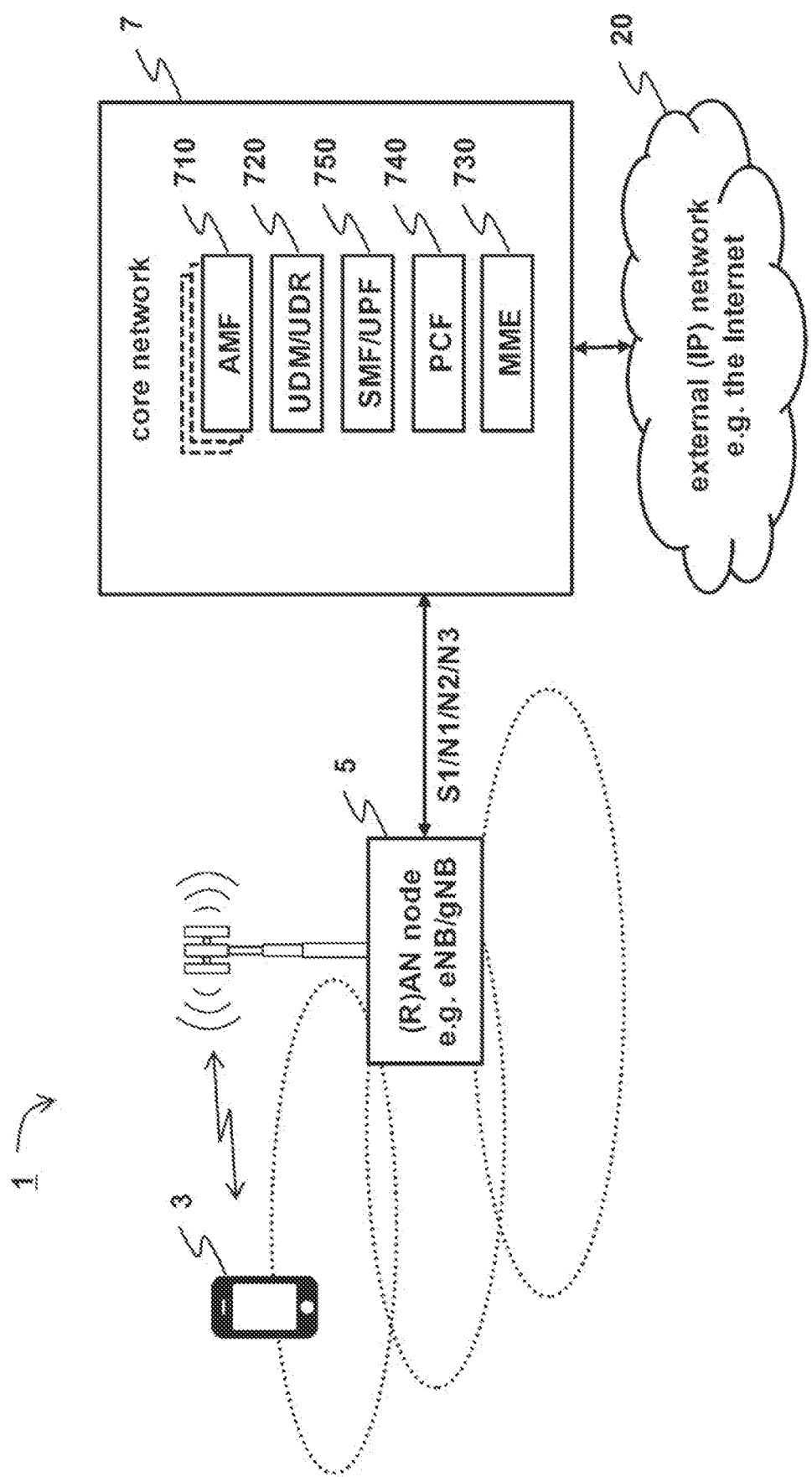
FIG. 7 schematically illustrates a mobile telecommunication system 1.

FIG. 7 schematically illustrates a mobile (cellular or wireless) telecommunication system 1 to which the above embodiments are applicable.

In this network, users of mobile devices 3 (UEs) can communicate with each other and other users via respective base stations 5 and a core network 7 using an appropriate 3GPP radio access technology (RAT), for example, an E-UTRA and/or 5G RAT. It will be appreciated that a number of base stations 5 form a (radio) access network or (R)AN. As those skilled in the art will appreciate, whilst one mobile device 3 and one base station 5 are shown in FIG. 7 for illustration purposes, the system, when implemented, will typically include other base stations and mobile devices (UEs).

Each base station 5 controls one or more associated cells (either directly or via other nodes such as home base stations, relays, remote radio heads, distributed units, and/or the like). A base station 5 that supports E-UTRA/4G protocols may be referred to as an 'eNB' and a base station 5 that supports Next Generation/5G protocols may be referred to as a 'gNBs'. It will be appreciated that some base stations 5 may be configured to support both 4G and 5G, and/or any other 3GPP or non-3GPP communication protocols.

The mobile device 3 and its serving base station 5 are connected via an appropriate air interface (for example the so-called 'Uu' interface and/or the like). Neighboring base stations 5 are connected to each other via an appropriate base station to base station interface (such as the so-called 'X2' interface, 'Xn' interface and/or the like). The base station 5 is also connected to the core network nodes via an appropriate interface (such as the so-called 'S1', 'N1', 'N2', 'N3' interface, and/or the like).

The core network 7 typically includes logical nodes (or 'functions') for supporting communication in the telecommunication system 1. Typically, for example, the core network 7 of a 'Next Generation'/5G system will include, amongst other functions, control plane functions (CPFs) and user plane functions (UPFs). It will be appreciated that the core network 7 may also include, amongst others: one or more Access and Mobility Management Function (AMF) 710; one or more Unified Data Management (UDM)/Unified Data Repository (UDR) node 720; a Session Management Function (SMF)/UPF 750, a Policy Control Function (PCF) 740, and a Mobility Management Entity (MME) 730.

From the core network 7, connection to an external IP network 20 (such as the Internet) is also provided.

The components of this system 1 are configured to perform the above described exemplary embodiments.

User Equipment (UE)

Figure 8:
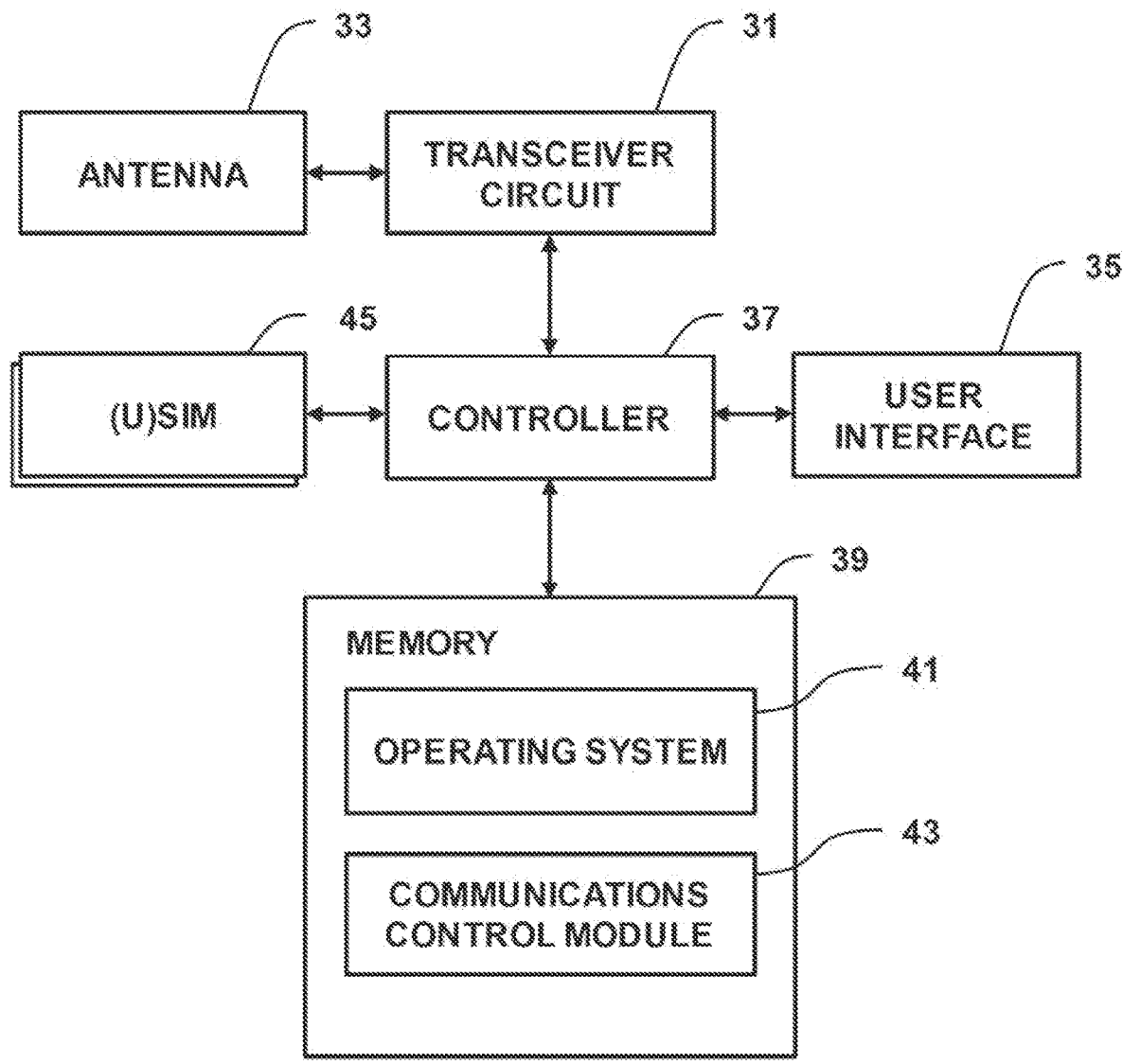
FIG. 8 is a block diagram illustrating the main components of the UE.

FIG. 8 is a block diagram illustrating the main components of the UE (mobile device 3) shown in FIG. 7. As shown, the UE includes a transceiver circuit 31 which is operable to transmit signals to and to receive signals from the connected node(s) via one or more antenna 33. Although not necessarily shown in FIG. 8, the UE will of course have all the usual functionality of a conventional mobile device (such as a user interface 35) and this may be provided by any one or any combination of hardware, software and firmware, as appropriate. A controller 37 controls the operation of the UE in accordance with software stored in a memory 39. The software may be pre-installed in the memory 39 and/or may be downloaded via the telecommunication network 1 or from a removable data storage device (RMD), for example. The software includes, among other things, an operating system 41 and a communications control module 43. The communications control module 43 is responsible for handling (generating/ sending/receiving) signalling messages and uplink/downlink data packets between the UE 3 and other nodes, including (R)AN nodes 5, core network nodes, and application functions. Such signaling includes appropriately formatted requests and responses relating to registration/deregistration of multi-SIM UEs.

The term "UE" refers to the mobile phone in general, which includes at least the following components:

Mobile Equipment (ME): the ME is the "mobile phone" as the hardware device. It includes at least one processor (controller), memory unit, antenna, transceiver unit, user interface (such as screen, buttons, cable socket), battery unit, etc., as described with reference to FIG. 9 above.

Subscriber Identity Module (SIM) or Universal Subscriber Identity Module (USIM): the SIM or USIM is an application that runs in the UICC card. The UICC card is a small integrated circuit that includes an associated processor (controller), a communication module, a memory unit, and an interface unit to communicate with the ME part of the UE 3. The UICC is also called a "smart card". The processor controls the operation of the USIM in accordance with software stored in the memory. The USIM software includes, among other things, an operating system (OS), and a communications control module.

The term 'SIM' generally refers to the application in the UICC card that is used in 2G GSM mobile system. The term 'USIM' generally refers to the application in the UICC card that is used in 3G (UMTS), 4G (LTE), and 5G systems. In addition, 'eSIM' is a SIM functionality embedded in the ME 30 itself, rather than being provided using a physical (removable) UICC card. In most technical context, these terms are interchangeable, and the term 'SIM' is more generic. From the perspective of the present disclosure, the terms 'SIM', 'USIM', and 'eSIM' are used interchangeably. The SIM and USIM application and eSIM contain the credentials, such as the long term identifier (IMSI in 3GPP) and long term secret key.

In this disclosure, either 'ME', 'mobile device', or simply 'device' is used to refer to the same entity, namely the mobile handset in general for any generation of technology. In addition, 'SIM' or 'USIM' are used in this disclosure depending on the context. However, they generally refer to the applications that reside in the UICC.

The UE 3 may be a multi-SIM device. Typically, a multi-SIM capable mobile device is equipped with two SIM card slots, thus it is also generally referred to as a 'dual-SIM phone'. In another UE implementation, the mobile device is equipped with one SIM card slot and another SIM functionality is embedded in hardware ('eSIM'). The mobile device may have an individual IMEI for each SIM, or a single IMEI common to all SIMs in the mobile device. One example of having single IMEI common to all SIMs is when a single UICC card contains multiple USIM applications.

The multi-SIM device/UE may be equipped with one or more transceiver circuits 31, depending on hardware implementation. When present, such multiple transceiver circuits 31 enable simultaneous connection using multiple SIMs.

(R)AN Node

Figure 9:
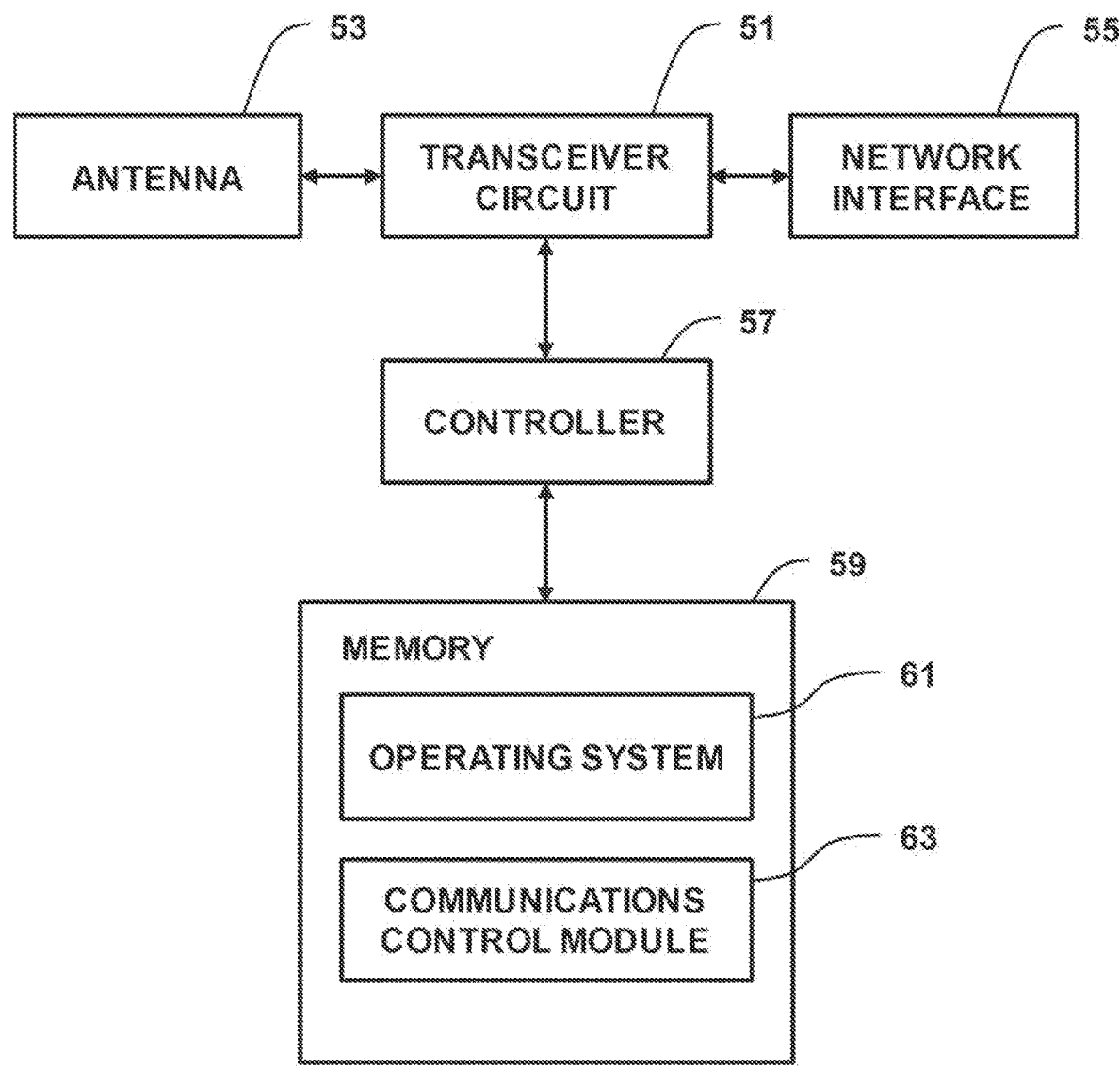
FIG. 9 is a block diagram illustrating the main components of an exemplary (R)AN node.

FIG. 9 is a block diagram illustrating the main components of an exemplary (R)AN node 5 (base station) shown in FIG. 7. As shown, the (R)AN node 5 includes a transceiver circuit 51 which is operable to transmit signals to and to receive signals from connected UE(s) 3 via one or more antenna 53 and to transmit signals to and to receive signals from other network nodes (either directly or indirectly) via a network interface 55. The network interface 55 typically includes an appropriate base station-base station interface (such as X2/Xn) and an appropriate base station-core network interface (such as S1/N1/N2/N3). A controller 57 controls the operation of the (R)AN node 5 in accordance with software stored in a memory 59. The software may be pre-installed in the memory 59 and/or may be downloaded via the telecommunication network 1 or from a removable data storage device (RMD), for example. The software includes, among other things, an operating system 61 and a communications control module 63. The communications control module 63 is responsible for handling (generating/sending/receiving) signalling between the (R)AN node 5 and other nodes, such as the UE 3 and the core network nodes/AFs. Such signaling includes appropriately formatted requests and responses relating to registration/deregistration of multi-SIM UEs.

Core Network Node

Figure 10:
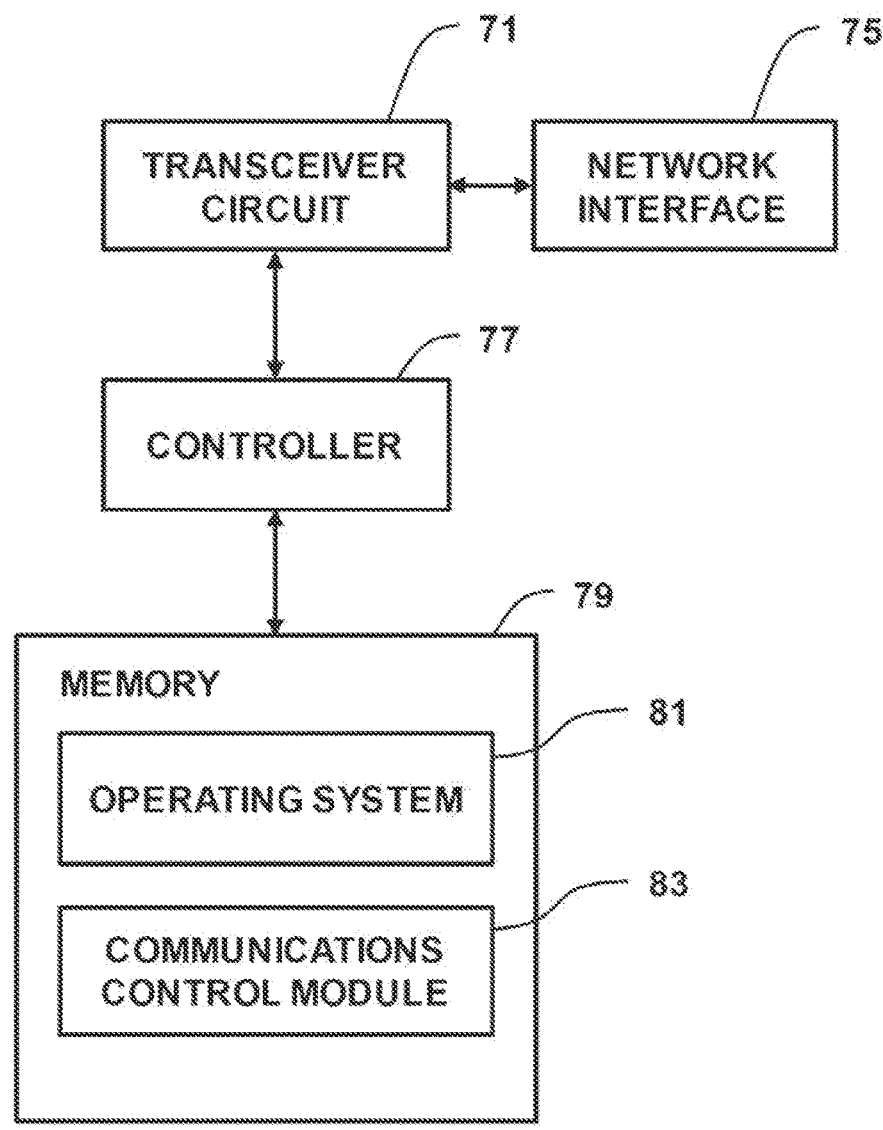
FIG. 10 is a block diagram illustrating the main components of a generic core network node.

FIG. 10 is a block diagram illustrating the main components of a generic core network node (or function) shown in FIGS. 1 to 7, for example, the AMF 710, the UDM/UDR 720, the SMF/UPF 750, the PCF 740, and the MME 730. As shown, the core network node includes a transceiver circuit 71 which is operable to transmit signals to and to receive signals from other nodes (including the UE 3 and the (R)AN node 5) via a network interface 75. A controller 77 controls the operation of the core network node in accordance with software stored in a memory 79. The software may be pre-installed in the memory 79 and/or may be downloaded via the telecommunication network 1 or from a removable data storage device (RMD), for example. The software includes, among other things, an operating system 81 and at least a communications control module 83.

The communications control module 83 is responsible for handling (generating/sending/receiving) signaling between the core network node and other nodes, such as the UE 3, (R)AN node 5, the AFs, and other core network nodes. Such signaling includes appropriately formatted requests and responses relating to registration/deregistration of multi-SIM UEs.

Modifications and Alternatives

Detailed embodiments have been described above. As those skilled in the art will appreciate, a number of modifications and alternatives can be made to the above embodiments whilst still benefiting from the disclosures embodied therein. By way of illustration only a number of these alternatives and modifications will now be described.

In the above description, the UE, the (R)AN node, and the core network node are described for ease of understanding as having a number of discrete modules (such as the communication control modules). Whilst these modules may be provided in this way for certain applications, for example where an existing system has been modified to implement the disclosure, in other applications, for example in systems designed with the inventive features in mind from the outset, these modules may be built into the overall operating system or code and so these modules may not be discernible as discrete entities. These modules may also be implemented in software, hardware, firmware or a mix of these.

Each controller may comprise any suitable form of processing circuitry including (but not limited to), for example: one or more hardware implemented computer processors; microprocessors; central processing units (CPUs); arithmetic logic units (ALUs); input/output (IO) circuits; internal memories/caches (program and/or data); processing registers; communication buses (e.g. control, data and/or address buses); direct memory access (DMA) functions; hardware or software implemented counters, pointers and/or timers; and/or the like.

In the above embodiments, a number of software modules were described. As those skilled in the art will appreciate, the software modules may be provided in compiled or un-compiled form and may be supplied to the UE, the (R)AN node, and the core network node as a signal over a computer network, or on a recording medium. Further, the functionality performed by part or all of this software may be performed using one or more dedicated hardware circuits. However, the use of software modules is preferred as it facilitates the updating of the UE, the (R)AN node, and the core network node in order to update their functionalities.

The above embodiments are also applicable to 'non-mobile' or generally stationary user equipment.

Various other modifications will be apparent to those skilled in the art and will not be described in further detail here.

Abbreviations
5GC 5G Core Network
5GS 5G System
5G-AN 5G Access Network
5G-GUTI 5G Globally Unique Temporary Identity
5G-TMSI 5G Temporary Mobile Subscriber Identity
AMF Access and Mobility Management Function
AN Access Network
AS Access Stratum
BYOD Bring Your Own Device
DRX Discontinuous Reception
gNB Next generation Node B
MME Mobility Management Entity
NAS Non-Access Stratum
NF Network Function
NG-RAN Next Generation Radio Access Network
NR New Radio
PCC Policy and Charging Control
PCF Policy Control Function
PDU Protocol Data Unit
PEI Permanent Equipment Identifier
PLMN Public land mobile network
(R)AN (Radio) Access Network
RAT Radio Access Technology
RRC Radio Resource Control
SMF Session Management Function
SUCI Subscription Concealed Identifier
SUPI Subscription Permanent Identifier
S-NSSAI Single Network Slice Selection Assistance Information
UDM Unified Data Management
UDR Unified Data Repository
UE User Equipment
UICC Universal Integrated Circuit Card
(U)SIM Universal Subscriber Identity Module Definitions For the purposes of the present document, the terms and definitions given in 3GPP TR 21.905 [1] and the following apply. A term defined in the present document takes precedence over the definition of the same term, if any, in 3GPP TR 21.905 [1].

CITATION LIST

Non Patent Literature

[NPL 1] 3GPP TR 21.905: "Vocabulary for 3GPP Specifications". V15.0.0 (2018-03)
[NPL 2] 3GPP TS 23.501: "System Architecture for the 5G System; Stage 2". V15.4.0 (2019-03)
[NPL 3] 3GPP TS 23.502: "Procedures for the 5G System; Stage 2" V15.4.1 (2019-03)
[NPL 4] 3GPP TR 23.761/S2-1901392: "Architectural enhancements for 5G multicast-broadcast services" (2019-01)

This application is based upon and claims the benefit of priority from European patent application No. 19172648.8, filed on May 3, 2019, the disclosure of which is incorporated herein in its entirely by reference.

REFERENCE SIGNS LIST

1 TELECOMMUNICATION SYSTEM
3 MOBILE DEVICE (UE)
31 TRANSCEIVER CIRCUIT
33 ANTENNA
35 USER INTERFACE
37 CONTROLLER
39 MEMORY
41 OPERATING SYSTEM
43 COMMUNICATION CONTROL MODULE
45 (U)SIM
5 (R)AN NODE (gNB)
51 TRANSCEIVER CIRCUIT
53 ANTENNA
55 NETWORK INTERFACE
57 CONTROLLER
59 MEMORY
61 OPERATING SYSTEM
63 COMMUNICATION CONTROL MODULE
7 CORE NETWORK
71 TRANSCEIVER CIRCUIT
75 NETWORK INTERFACE
77 CONTROLLER
79 MEMORY
81 OPERATING SYSTEM
83 COMMUNICATION CONTROL MODULE
710 AMF
720 UDM/UDR
730 MME
740 PCF
750 SMF/UPF
20 EXTERNAL IP NETWORK

What is claimed is:

1. A core network node for mobility management, comprising:
a memory storing instructions; and
one or more processors configured to execute the instructions to:
receive, in a registration procedure, from a user equipment (UE), a first message comprising a first parameter related to a Multi-Subscriber Identity Module (Multi-SIM) capability of the UE, wherein the first parameter is different from a UE identity (ID) related parameter and is based on the UE activating Multi-SIM;
after receipt of the first message, transmit, to the UE, a second message comprising a second parameter related to the Multi-SIM capability of the UE; and
receive, from the UE, a third message comprising a third parameter related to the Multi-SIM capability of the UE, wherein the third parameter is different from the UE ID related parameter, the third parameter has a value different from a value of the first parameter, and the third parameter is based on the UE activating a Single-SIM.

2. The core network node according to claim 1, wherein the core network node is an Access and Mobility Management Function (AMF) node.

3. A user equipment (UE), comprising:
a memory storing instructions; and
one or more processors configured to execute the instructions to:
transmit, in a registration procedure, to a core network node for mobility management, a first message comprising a first parameter related to a Multi-Subscriber Identity Module (Multi-SIM) capability of the UE, wherein the first parameter is different from a UE identity (ID) related parameter and is based on the UE activating Multi-SIM;
after transmission of the first message, receive, from the core network node for mobility management, a second message comprising a second parameter related to the Multi-SIM capability of the UE; and transmit, to the core network node for mobility management, a third message comprising a third parameter related to the Multi-SIM capability of the UE, wherein the third parameter is different from the UE ID related parameter, the third parameter has a value different from a value of the first parameter, and the third parameter is based on the UE activating a Single-SIM.

4. The UE according to claim 3, wherein the core network node is an Access and Mobility Management Function (AMF) node.

5. A method for a core network node for mobility management, the method comprising:

receiving, in a registration procedure, from a user equipment (UE), a first message comprising a first parameter related to a Multi-Subscriber Identity Module (Multi-SIM) capability of the UE, wherein the first parameter is different from a UE identity (ID) related parameter and is based on the UE activating Multi-SIM;

after the receiving the first message, transmitting, to the UE, a second message comprising a second parameter related to the Multi-SIM capability of the UE; and receiving, from the UE, a third message comprising a third parameter related to the Multi-SIM capability of the UE, wherein the third parameter is different from the UE ID related parameter, the third parameter has a value different from a value of the first parameter, and the third parameter is based on the UE activating a Single-SIM.

6. The method according to claim 5, wherein the core network node is an Access and Mobility Management Function (AMF) node.

7. A method for a user equipment (UE), the method comprising:

transmitting, in a registration procedure, to a core network node for mobility management, a first message comprising a first parameter related to a Multi-Subscriber Identity Module (Multi-SIM) capability of the UE, wherein the first parameter is different from a UE identity (ID) related parameter and is based on the UE activating Multi-SIM;

after the transmitting the first message, receiving, from the core network node for mobility management, a second message comprising a second parameter related to the Multi-SIM capability of the UE; and transmitting, to the core network node for mobility management, a third message comprising a third parameter related to the Multi-SIM capability of the UE, wherein the third parameter is different from the UE ID related parameter, the third parameter has a value different from a value of the first parameter, and the third parameter is based on the UE activating a Single-SIM.

8. The method according to claim 7, wherein the core network node is an Access and Mobility Management Function (AMF) node.

* * * * *